United States Patent [19]

Dillon

[11] 4,070,793

[45] Jan. 31, 1978

[54] PLANT PROPAGATING AND SHIPPING DEVICE AND METHOD

[75] Inventor: Michael Francis Dillon, Athens, Ga.

[73] Assignee: Flowers, Inc., Athens, Ga.

[21] Appl. No.: 729,889

[22] Filed: Oct. 6, 1976

[51] Int. Cl.$^2$ ............................................. A47G 7/02
[52] U.S. Cl. ........................................ 47/67; 47/84; 206/423
[58] Field of Search ................. 47/1.2, 67, 73, 83, 47/84, DIG. 3; D6/113, 114, 137; 206/423; 211/113

[56] References Cited

U.S. PATENT DOCUMENTS

| 1,655,731 | 1/1928 | May, Jr. et al. | 47/73 |
| 2,431,890 | 12/1947 | Raines | 47/DIG. 3 |
| 2,593,895 | 4/1952 | Kohl | 47/73 X |
| 2,739,701 | 3/1956 | Sarrat et al. | 206/423 |
| 3,087,666 | 4/1963 | Kitchell | 206/423 X |
| 3,754,642 | 8/1973 | Stidolph | 47/84 |

FOREIGN PATENT DOCUMENTS

| 1,162,225 | 9/1958 | France | 206/423 |

Primary Examiner—E. H. Eickholt
Attorney, Agent, or Firm—Walter M. Rodgers; Walter A. Rodgers

[57] ABSTRACT

A plant propagating sleeve comprises top, bottom and side walls interconnected along their side edges to form a tubular open ended structure having a plurality of aligned longitudinal apertures formed in each side wall of the sleeve for respectively receiving the stems of plant cuttings to be rooted by means of fluid injected through one or more open ends of the sleeve and which may contain nutrients and insecticides. A plurality of sleeves are stacked into a frame structure having hanger means at the top and bottom thereof whereby vertically disposed stacked sleeves within the frame may be alternately inverted to insure that the cuttings remain substantially horizontal. Sleeves whose cuttings have been rooted may be arranged in stacked relationship and then disposed within a shipping container, the width of which is greater than the width of the stack of sleeves so as to afford space in which the parts of the cuttings outside the sleeve may be retained during shipment of the container and associated stack of sleeves having rooted plants therein. If desired, the sleeves may be turned inside out after roots are established and before placement into a shipping container.

4 Claims, 5 Drawing Figures

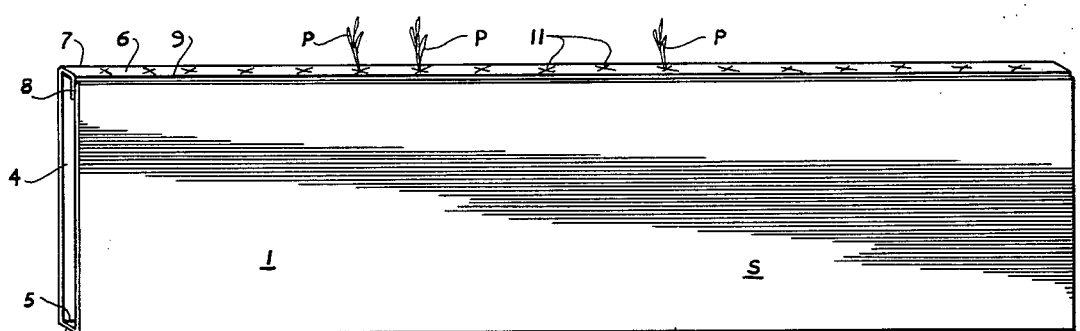
FIG 1
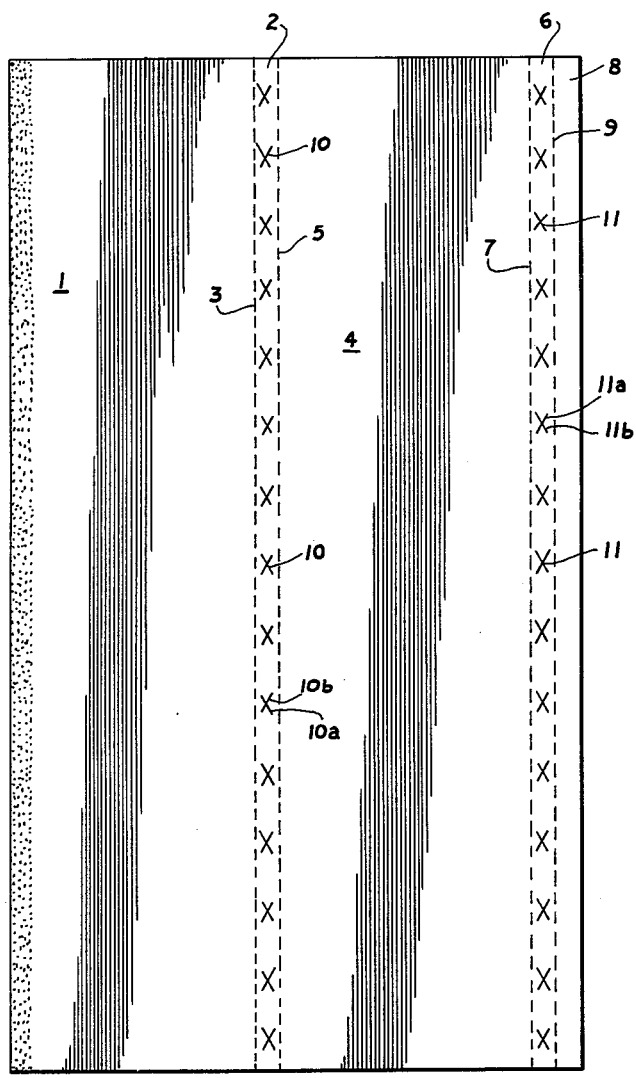
FIG 2
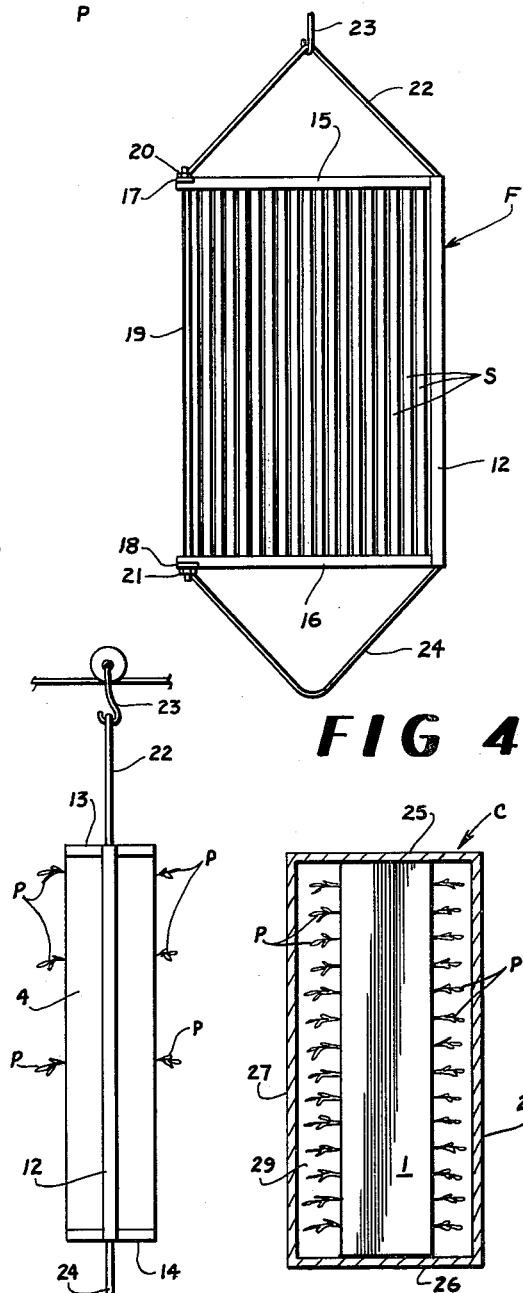
FIG 4
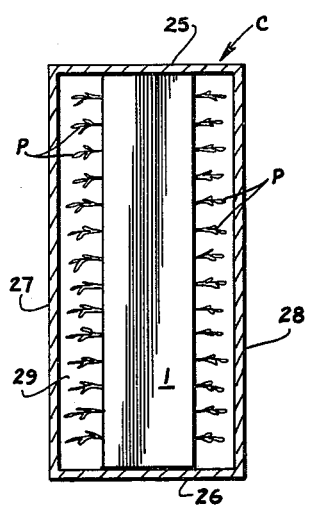
FIG 3
FIG 5

PLANT PROPAGATING AND SHIPPING DEVICE AND METHOD

Cumbersome arrangements are known in which cuttings are rooted by means of liquid supplied to the entire cutting. Such procedures require complicated support means for holding the cuttings vertically erect and are also heavy and are not well suited for use in conjunction with shipping containers.

According to this invention in one form, a lightweight and inexpensive plant propagating sleeve is provided which comprises top, bottom and side walls interconnected along their side edges to form an open ended tubular structure. A plurality of aligned apertures are formed in each side wall and cuttings to be rooted are inserted inwardly through the side walls so that the inner ends of the stem portions are disposed within the tubular sleeve. Thereafter a plurality of sleeves are stacked in vertical relationship within a frame having hanger means at the top and bottom which are engageable alternately with support means so that the sleeves my be inverted daily and by this means to insure horizontal disposition of the cuttings. According to a feature of the invention, a plurality of sleeves having rooted cuttings may be mounted within a container which is somewhat wider than the width of the stacked sleeves so as to provide space for the leaf portions of the rooted cuttings and such structure may conveniently be used as a shippng container since propagated plants which are properly rooted are capable of surviving a period of several days when properly rooted by liquified gas containing appropriate quantities and types of nutrients and insecticides therein.

For a better understanding of the invention reference may be had to the following detailed description taken in conjunction with the accompanying drawings in which FIG. 1 is a perspective view of a set up plant propagating open ended sleeve S constructed according to the invention;

FIG. 2 is a plan view of a blank from which the sleeve of FIG. 1 is formed;

FIG. 3 is an end view of a frame structure in which a plurality of vertically disposed stacked sleeves such as are shown in FIG. 1 are mounted;

FIG. 4 is a side view of the structure shown in FIG. 3 and in which

FIG. 5 is a cross sectional plan view showing a stack of sleeves such as that depicted in FIG. 1 in which rooted cuttings are mounted and disposed within a shipping container.

In the drawings the numeral 1 designates a wall of the sleeve which as described in the specification and as recited in the claims is referred to as the top wall. The numeral 2 designates a side wall of the sleeve which is foldably joined along fold line 3 to a side edge of top wall 1. Bottom wall 4 is foldably joined along a side edge 5 to an edge of side wall 2. Side wall 6 is foldably joined along fold line 7 to a side edge of bottom wall 4. A glue flap 8 is foldably joined along fold lines 9 to an edge of side wall 6. A plurality of apertures designated by the numeral 10 are formed in longitudinal aligned relationship in side wall 2 and similar aligned horizontally disposed apertures 11 are formed in side wall 6. Preferably apertures 10 and 11 are formed by intersecting slits such as are designated at 10a and 10b and such as are indicated at 11a and 11b.

In order to assemble the sleeve from the blank shown in FIG. 2, glue flap 8 and side wall 6 are simply elevated from the positions shown in FIG. 2 and folded upwardly and toward the left fold line 7 into flat face contacting relation with bottom wall 4. Thereafter an application of glue is made to the left hand edge of top wall 1 as indicated by stippling in FIG. 2. Thereafter top wall 1 is elevated and folded toward the right along fold line 3 so as to cause its stippled edge to adhere to the glue flap 8. This operation completes the formation of the sleeve and results in a collapsed disposition thereof with a part of the top wall 1 lying in flat face contacting relation with the side wall 2 and with another part of top wall 1 lying in flat face contacting relation with bottom wall 4 and with glue flap 8.

In order to assemble the sleeve into set up condition, it is simply necessary to elevate top wall 1 and simultaneously move it toward the right while securely holding bottom wall 4 against movement in any direction. This operation of course simply results in causing the sleeve to occupy the set up condition as shown in FIG. 1.

With the sleeve set up as shown in FIG. 1, a plurality of plant cuttings P having stem portions and leaf portions are simply inserted into the apertures 10 and 11. Thereafter a plurality of sleeves such as that shown in FIG. 1 are assembled in vertically aligned stacked relationship with the bottom panel of a particular sleeve in face contacting relation with the top panel 1 of an adjacent sleeve. When so stacked and vertically oriented, the sleeves S are mounted into frame structure F shown in FIGS. 3 and 4. Frame structure F simply comprises a vertical element 12 to the upper end of which a horizontal element 13 is secured as by welding or otherwise. A horizontal element 14 is secured to the bottom end of vertical element 12. Horizontal elements 15 and 16 are secured to opposite ends of horizontal elements 13 and 14 respectively and cross bar 17 is interconnected with the left hand ends of the bars 15 while a horizontal cross bar 18 is interconnected with the left hand ends of bars 16. A vertical rod 19 is inserted through holes in bars 17 and 18 and is secured by nuts 20 and 21 to the bars 17 and 18 to form a closure for the frame structure F after all of the sleeves S are inserted therein as represented in FIGS. 3 and 4.

Since the plant cuttings P inserted within the apertures 10 and 11 are horizontally disposed, the cuttings would tend to grow upwardly if allowed to remain in the position represented by FIGS. 3 and 4. In view of this fact, hanger means designated by the numeral 22 in the form of a wire or other suitable structure is secured by any suitable manner with the frame structure F and is supported on support structure in the form of a hook 23. Similarly wire or other suitable hanger means 24 is secured to the lower portion of the frame F as shown in FIGS. 3 and 4. Thus the structure as shown in FIGS. 3 and 4 is supported by hanger means 22 for a day and then inverted and supported by hanger means 24 from support means 23 on a succeeding day. This alternate inversion of the frame F and its associated sleeves insures that the cuttings remain substantially horizontal throughout the propagating season.

After a batch of cuttings is fully rooted and ready for shipment, the arrangement shown in FIG. 5 may be employed according to one facet of the invention. In FIG. 5, a container C is shown in cross section and a plurality of sleeves S are shown in stacked relation one above the other and with the rooted plants P disposed on opposite sides of the stack of sleeves S. Of course this arrangement is possible because the container C is constructed so that its end walls 25 and 26 are substantially wider than the walls 1 and 4 of the sleeves S. Thus a stack of sleeves such as indicated at S in FIG. 5 and disposed intermediate the side walls 27 and 28 forms plant receiving space between the stack of sleeves S and each side wall 27 and 28 in which the plants P are disposed. Of course the container C is provided with a top (not shown) and with a top wall which is not shown in FIG. 5.

The arrangement shown in FIG. 5 is light in weight and economical to produce since the sleeves S preferably are formed of light weight paperboard appropriately treated with suitable liquid proofing material and since the glue used is of the non-soluble type. Furthermore the container C can be formed of suitable moisture resistant paperboard such as corrugated board. When properly rooted, the plants P remain alive and in good condition for a period of several days and hence may be shipped for considerable distances from the place of propagation to the location at which the plants P are removed from their associated sleeves S and then set out in individual pots or are otherwise transplanted.

Of course the arrangement is quite beneficial according to one facet of the invention because no soil is required. Thus regulatory governmental groups need not interfere with shipment since no soil is employed. Furthermore the fluid used in propagation at the initial point of propagation contains not only appropriate nutrients supplied in liquid form via pipe L and vaporized by air under pressure in pipe A which is intermittently controlled by pneumatic valve V as schematically shown in FIG. 4 and which are well suited for the particular plants and in quantities which are properly selected, such material also includes appropriate insecticides which may constitute ozone or other suitable insect controlling substances which are well known.

The embodiments of the invention in which an exclusive property or privilege is claimed are defined as follows:

1. A plant propagating open ended hollow sleeve comprising top, bottom and side walls interconnected along their side edges to form a tubular structure, the height of said side walls being slightly in excess of the diameter of the stems of cuttings used in propagating plants from such cuttings and said top and bottom walls being considerably wider than the height of said side walls, and a plurality of longitudinally aligned apertures formed in each of said side walls for receiving the stems of a plurality of cuttings respectively, each of said apertures comprising a pair of angularly disposed intersecting slits.

2. A plant propagating device comprising a frame, a plurality of open ended sleeves each having top, bottom and side walls interconnected along their side edges to form a plurality of tubular structures, a plurality of aligned apertures formed in each side wall of each of said sleeves for receiving plant cuttings to be propagated, said sleeves being grouped together and arranged vertically in stacked relation within said frame, support means, and hanger means secured to the top and bottom of said frame and arranged alternately to engage said support means whereby said device may be inverted, said sleeves allowing plant propagating fluid through either open end.

3. A device according to claim 2 wherein said fluid comprises air conditioning liquid particles of plant nutrients and of insecticides.

4. A plant propagating and shipping device comprising a container having top, bottom, side and end walls interconnected along their side edges to form a six sided structure, a plurality of open ended sleeves each having top, bottom, and side walls interconnected along their side edges to form a plurality of tubular structures, the top and bottoms walls of each of said sleeves being considerably wider than the weight of the side walls thereof and the height of said side walls of each of said sleeves being but slightly in excess of the diameter of the stems of cuttings used in propagating plants and the width of the top and bottom walls of said container being considerably greater than the width of the top and bottom walls of said sleeves so that a stack of sleeves disposed within said container and intermediate the side walls thereof defines a plant holding space on each side of said stack of sleeves, and a plurality of intersecting slits defining stem holding apertures formed in each side wall of each of said sleeves for receiving a plurality of plant cutting stems respectively.

* * * * *